United States Patent [19]

DeCrane

[11] Patent Number: 5,564,264

[45] Date of Patent: Oct. 15, 1996

[54] BULK CONTAINER TRANSFER DEVICE

[76] Inventor: Charles E. DeCrane, 802 Janna St., W. Monroe, La. 71291

[21] Appl. No.: 210,575

[22] Filed: Mar. 18, 1994

[51] Int. Cl.⁶ ........................................... B65B 05/00
[52] U.S. Cl. ........................ 53/251; 53/502; 198/369.6
[58] Field of Search ............. 53/251, 502; 198/369.6, 198/463.3

[56] References Cited

U.S. PATENT DOCUMENTS

| | | | |
|---|---|---|---|
| 3,921,789 | 11/1975 | Goldinger et al. | 198/369.6 |
| 4,047,625 | 9/1977 | Grant | 198/463.3 |
| 4,676,284 | 6/1987 | DeCrane | 141/114 |
| 4,926,999 | 5/1990 | Fauth, Sr. et al. | 198/463.3 |
| 4,964,478 | 10/1990 | DeCrane | 414/798.1 |
| 5,036,689 | 8/1991 | DeCrane | 141/114 |
| 5,165,455 | 11/1992 | DeCrane | 141/10 |
| 5,205,394 | 4/1993 | Zeuschner | 198/463.3 |
| 5,406,770 | 4/1995 | Fikacek | 53/502 |

*Primary Examiner*—Lowell A. Larson
*Assistant Examiner*—Gene L. Kim
*Attorney, Agent, or Firm*—Norvell E. Von Behren; Michael A. Capraro

[57] ABSTRACT

A transfer device designed to reposition and to move heavy filled bulk containers and bags ninety degrees from their original position without lifting the heavy filled bulk container or bag. The transfer device is designed with a moveable upper frame structure that contains a plurality of spaced apart groups of rollers providing a pair of elongated openings. The transfer device also has an inner fixed frame that contains a pair of transfer conveyors, in the preferred embodiment, exposed in the pair of elongated openings whenever the moveable upper frame structure drops downwardly. This permits the pair of transfer conveyors to transfer the container weight from the rollers and to carry the weight of the filled bulk container previously resting on the plurality of rollers. The pair of transfer conveyors then move the filled bulk container from the transfer device in a direction ninety degrees from the original direction that the container was traveling on the rollers of the upper frame.

17 Claims, 3 Drawing Sheets

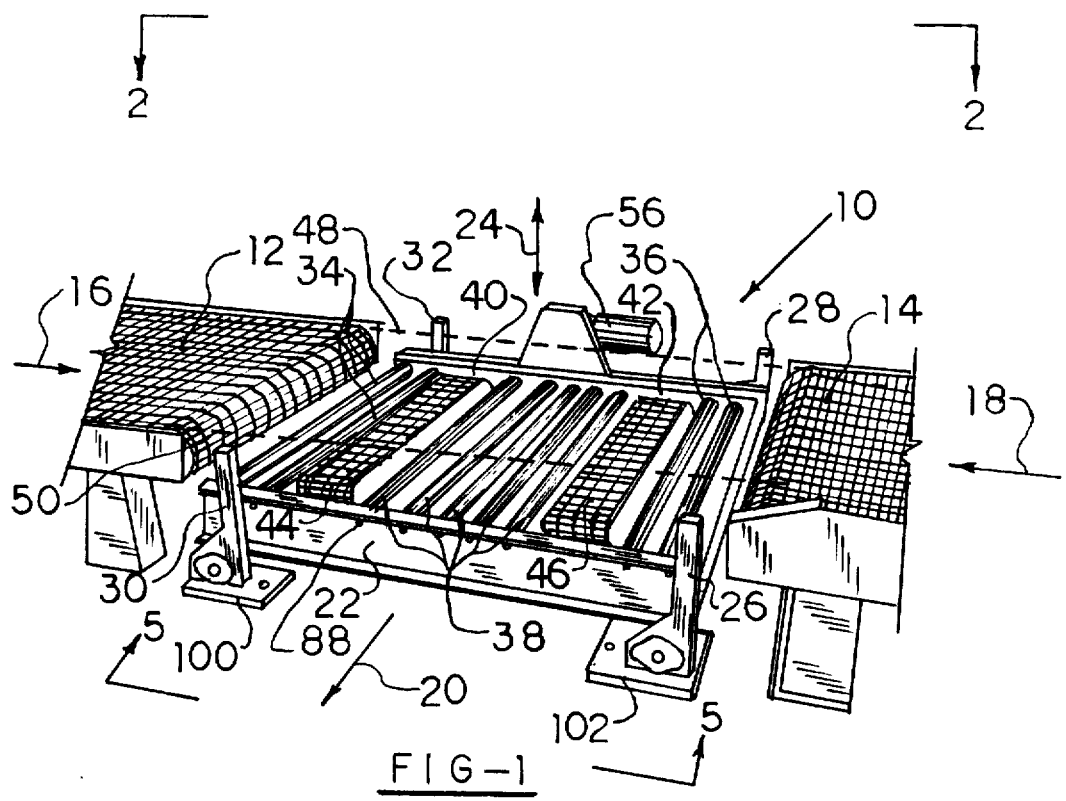
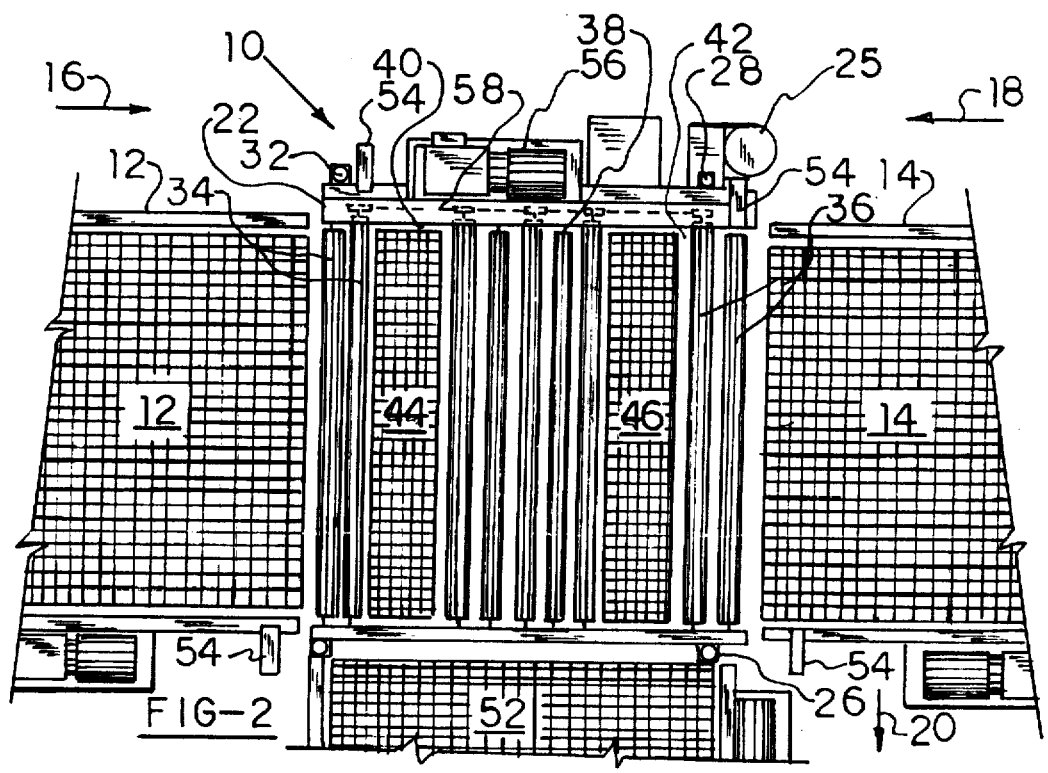

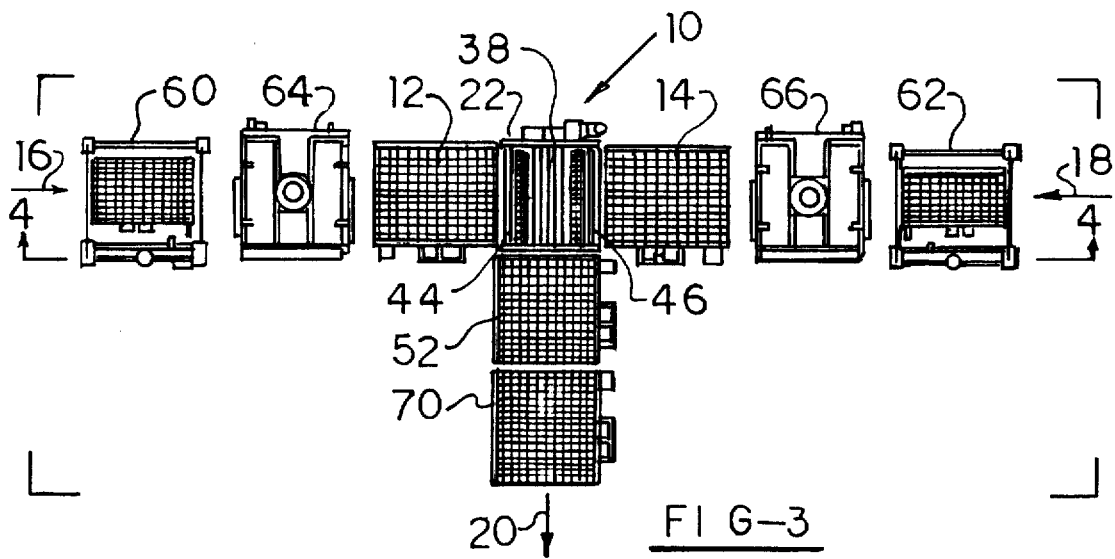
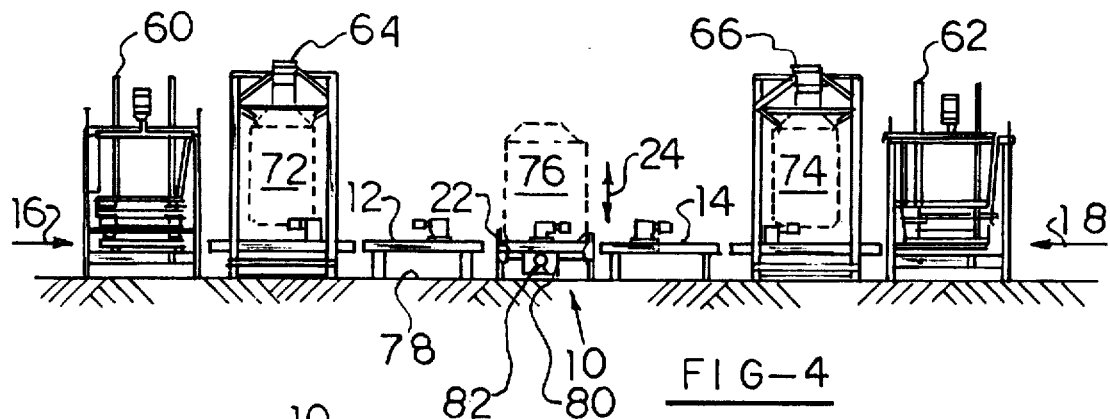
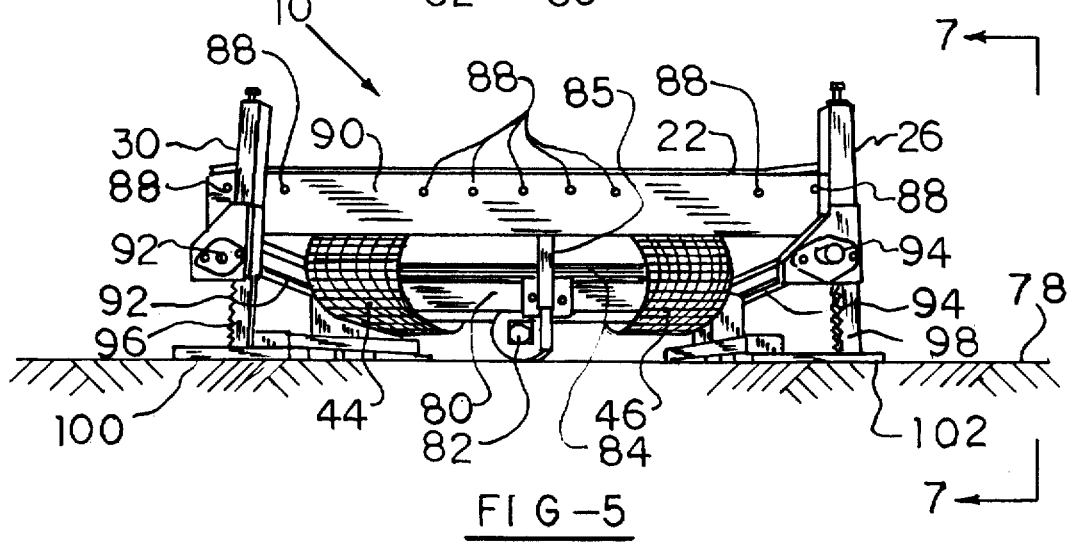

5,564,264

BULK CONTAINER TRANSFER DEVICE

BACKGROUND OF THE INVENTION

This invention relates generally to transfer devices for use with large containers and more specifically to a new and novel bulk container transfer device which permits the safe repositioning of heavy filled bulk containers from one moving direction to another moving direction ninety degrees from it's original traveling direction.

Large bulk containers, used for the movement of bulk material from one location in a plant to another location, have capacities ranging from twenty cubic feet up to seventy-cubic feet and may weigh from 700 to 3,300 pounds or more. With the introduction of these large capacity bulk containers such as bulk bags, boxes and heavy pallets, former methods of changing the direction of the large containers from one position to a position ninety degrees from their original position, as in a transfer line, became difficult.

Since a large filled bulk bag can weigh as much as 3,300 pounds, prior art ninety degree turning and transfer devices could encounter long term mechanical problems in lifting the large loads and then repositioning the load ninety degrees. The continued lifting of a heavy bulk container can be very detrimental to the various components used in the transfer device, especially the mechanical components. Prior art transfer devices are generally known as pop-up transfer conveyors which often use pneumatic or hydraulic devices as well as other mechanical devices to accomplish the lifting of the large bulk container prior to repositioning it.

The prior art lifting of the large bulk container can also cause rough operation of the transfer device mechanisms due to the heavy forces needed to raise the large bulk bag upwardly before repositioning it ninety degrees and moving it off of the transfer device.

SUMMARY OF THE INVENTION

In order to overcome the before described considerations and problems inherent in and encountered with prior art upward lift, pop-up, transfer devices, there is provided by the subject invention a unique solution that utilizes the weight of the large bulk container operating with a unique drop-down transfer device design to achieve direction change on the transfer device. The new and novel transfer device construction permits the container, such as a bulk bag, to be moved downwardly, instead of upwardly, prior to achieving the ninety degree direction change of the bag. As a result, lifting of the large heavy filled bag is not required thereby minimizing the previous problems encountered in pop-up transfer devices.

The applicant's unique solution uses an upper moveable frame structure in the transfer device which is moveable from an upper position to a lower position. A plurality of spaced rollers are carried by the upper moveable frame and are spaced to provide at least one elongated opening between the rollers and preferably two openings. In the preferred embodiment, a pair of rollers are positioned on each side of the moveable upper frame and, in the central portion of the frame, five rollers are also carried by the upper moveable frame. These rollers carry the bag weight as the upper frame is moved downwardly.

The pair of elongated openings are provided between the outer pair of rollers and the inner 5 rollers. These elongated openings are designed to provide space for exposing a pair of chain type transfer conveyors which are positioned inside the upper moveable frame and beneath the rollers. An inner fixed frame is positioned beneath and within the upper moveable frame and carries the two chain type transfer conveyors along with their drive motor and gear reducer in the embodiment shown.

The two transfer conveyors are designed to support and to carry the container weight and to transport the container ninety degrees from the direction that the container traveled originally as it moved onto the rollers on the upper moveable frame. In other words, the two transfer conveyors are mounted for a perpendicular motion of the container compared to the motion provided by the plurality of rollers mounted on the moveable upper frame.

The moveable upper frame is lowered by four motor driven jacks mounted on each corner of the upper moveable frame. These jacks are designed to lower the top of the rollers on the upper moveable frame a distance of approximately six inches and slightly below the top surface of the transfer conveyors.

The top of the upper moveable frame rollers and the various chain conveyors used in a typical plant operation feeding the applicant's novel drop-down transfer device are designed to be approximately 18½ inches from the floor when in the upper position of the drop-down transfer device. The top of the chain conveyors on the outlet side of the applicant's device, moving downstream from the applicant's drop-down transfer device is then designed to be 12½ inches from the ground slab.

As a result, the lowering of the upper moveable frame of the applicant's device approximately 6 inches downwardly then exposes the top surface of the two transfer conveyors mounted on the inner fixed frame. The top surface of the two transfer conveyors are positioned in the elongated openings between the rollers, on the upper moveable frame, as the upper moveable frame rollers drop somewhat below the top surface of the two transfer conveyors.

The lowering of the rollers, which carry the weight of the filled container, beyond the top surface of the two transfer conveyors then transfers the weight of the large container onto the upper surface of the two transfer conveyors. The transfer conveyors then carry the weight of the large container. Since the two transfer conveyors are mounted for moving a container ninety degrees from the container's original position on the upper rollers, the large bulk container will then be moved ninety degrees from it's original position.

Accordingly, it is an object and advantage of the invention to provide a new and novel transfer device which permits a direction change of a large container without requiring the lifting of the container with the mechanicals of the transfer device.

Another object and advantage of the invention is to provide a new and novel large container transfer device that utilizes the effect of gravity on the weight of the container contents to achieve a minimum amount of the transfer force than normally utilized by prior art devices in order to reposition the large container.

Still another object and advantage of the invention is to provide a new and novel transfer device that may be utilized with other devices in a plant operation for a manufacturing process in order to smoothly stabilize and control the movement of large containers from a position ninety degrees from it's original position.

These and other objects and advantages will become apparent from a review of the drawings and from a study of the Description of the Preferred Embodiment which has been provided by way of illustration only.

BRIEF DESCRIPTION OF THE DRAWINGS

FIG. 1 is a perspective view of the applicant's unique drop-down transfer device, shown positioned with other devices in a plant operation. The device is used for transferring large containers from one portion of a plant operation to another portion and to change the direction of the movement of the large container by ninety degrees.

FIG. 2 is a plan view, taken along lines 2—2 of FIG. 1.

FIG. 3 is a plan view, similar to the view of FIG. 2, showing a plant operation utilizing the applicant's novel drop-down transfer device.

FIG. 4 is an elevational view, taken along lines 4—4 of FIG. 3, showing the alternate movement of two large containers from weighing filling stations towards the applicant's drop down transfer device.

FIG. 5 is a perspective view, taken along lines 5—5 of FIG. 1, showing the positioning of the before mentioned pair of lower transfer conveyors mounted on the fixed inner frame which is, in turn, positioned beneath and within the moveable upper frame of the applicant's device. In FIG. 5, the moveable upper frame is shown in it's upper position.

DESCRIPTION OF THE PREFERRED EMBODIMENT

Figure 7:
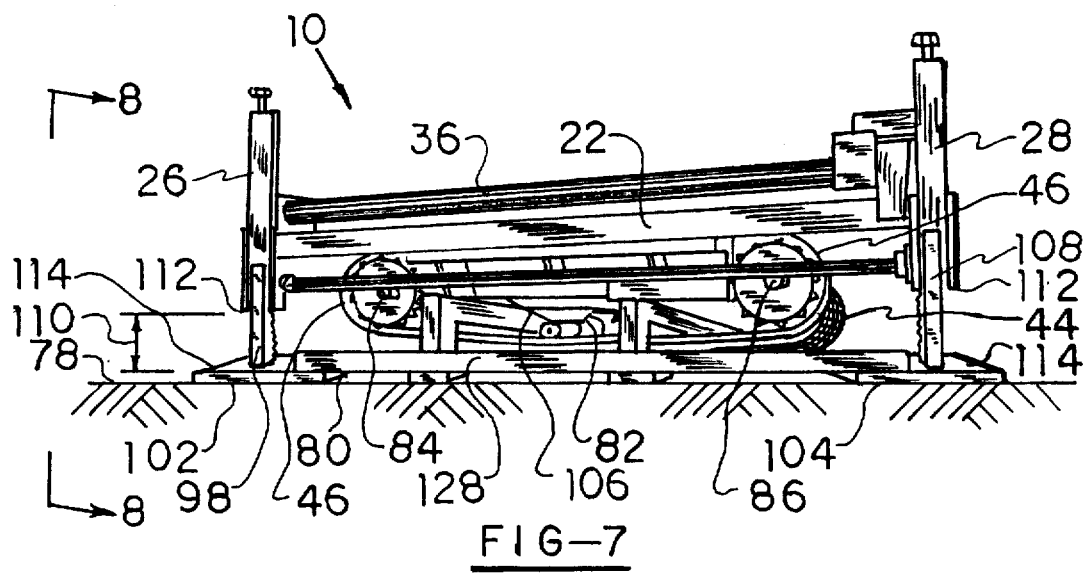
FIG. 7 is a perspective view, taken along lines 7—7 of FIG. 5 showing in more detail the fixed inner frame and the two transfer conveyors mounted on the inner frame as well as showing the positioning of the jack means used for lowering and raising the moveable upper frame, downwardly and upwardly, as desired.

Referring to the drawings in general and in particular to FIG. 1 of the drawings, there is shown a perspective view of the applicant's unique drop-down transfer device, shown generally by the numeral 10. The device 10 is shown positioned with other devices in a plant operation used for transferring large containers from one position of the operation to another position by changing the direction of the movement of the large filled container by ninety degrees. In the plant operation, a first chain conveyor 12 is positioned on the left of the applicant's device and is designed to move the containers in the direction to the right, as shown by the arrow 16, towards the applicant's device 10.

Another first chain conveyor 14 is positioned on the right of the applicant's device and is designed to move the containers to the left, in the direction shown by the arrow 18 towards the applicant's device 10. The novel device 10 is designed to change the container direction to the direction shown by the arrow 20. This is accomplished by using the upper moveable frame 22 which is designed to move downwardly and upwardly in the direction shown by the arrow 24.

The corners of the upper moveable frame 22 contain jacks 26, 28, 30, and 32 which are used to accomplishing the lowering and lifting of the moveable upper frame 22 as desired. These jacks are driven by the reversing gear motor 25, not shown in FIG. 1 of the drawings. The upper portion of the upper moveable frame 22 contains a pair of rollers 34 on the left side and a pair of rollers 36 on the right side. Five inner rollers 38 are mounted in the central portion of the upper frame 22 as shown in FIG. 1 of the drawings.

When positioned thusly, a pair of elongated openings 40 and 42 are formed in the upper portion of the upper moveable frame 22. These elongated openings 40 and 42 are positioned to receive the transfer conveyors 44 and 46 which change the direction of the large container, as will be described hereinafter.

In FIG. 1, the applicant's drop down transfer device 10 is shown in the lowered position with the transfer conveyors 44 and 46 shown exposed in the elongated openings 40 and 42. When in this position, the top surface of the transfer conveyors 44 and 46 is approximately 6 inches below the top surface (as shown by the dashed lines 48 and 50) of the upper rollers 34, 36, and 38.

Turning now to FIG. 2 of the drawings, there is shown a plan view, taken along lines 2—2 of FIG. 1. There can be seen in FIG. 2, a second chain conveyor 52, positioned as shown, which receives the repositioned large container after it is moved from the applicant's device 10 by the transfer conveyors 44 and 46. The stopping and starting and the positioning of the various devices is controlled by a plurality of photo eyes 54 as known in the art of transfer line design.

The rotation of the plurality of rollers 34, 36 and 38 is controlled by a reversing gear motor 56 mounted on the side of the moveable upper frame 22. A roller drive chain 58, shown dashed in FIG. 2, and a plurality of unnumbered chain sprockets permit a portion of the rollers 34, 36, and 38 to be alternately rotated clockwise or counterclockwise, to drive a container from each side of the transfer device 10 onto the transfer device 10.

Referring now to FIG. 3 of the drawings, there is shown a plan view, similar to the view of FIG. 2, of the plant operation utilizing the applicant's novel drop-down transfer device 10. A typical plant operation may comprise a pair of pallet dispensers 60 and 62 positioned as shown on the left and A right side of the applicant's device 10. A typical pallet dispenser 60 or 62 may be the type as designed by the applicant and patented under U.S. Pat. No. 4,964,782, issued on Oct. 23, 1990.

Next to the pallet dispensers 60 and 62 would be a pair of weigh filling stations 64 and 66 designed to receive pallets from the pallet dispensers 60 and 62 and to position them beneath an unfilled container. A typical weigh filling station 64 or 66 may be the type as designed by the applicant and patented under U.S. Pat. No. 4,676,284, issued on Jun. 30, 1987 or the design by the applicant and patented under U.S. Pat. No. 5,036,893, issued on Aug. 6, 1991. This patent utilizes the method shown in the applicant's Pat. No. 5,165,455, issued on Nov. 24, 1992.

Positioned on the downstream side of the applicant's drop-down transfer device 10 are at least one second chain conveyor 52 and may be a pair of chain conveyors 52 and 70 as shown in the FIG. 3 of the preferred embodiment. Other conveyors and downstream devices may also be utilized with the applicant's device 10, as desired. The large filled containers, such as bulk bags, move off of the applicant's drop-down transfer device 10, in the direction shown by the arrow 20, having been repositioned in a direction ninety degrees from their original position.

Turning now to FIG. 4 of the drawings, there is shown an elevational view, taken along lines 4—4 of FIG. 3, showing how alternate movement of two large containers 72 and 74 from weighing filling stations 64 and 66 move towards the applicant's drop down transfer device 10 and are positioned on the device. In FIG. 4, the alternately positioned filled large containers 72 and 74 are shown as the numeral 76 when they have been moved to a position on the applicant's device.

There can also be seen in FIG. 4 how the plant operation is mounted on the ground slab 78 and how the fixed inner frame 80 is designed to carry the motor 82 used to drive the transfer conveyors 44 and 46 which will be described in more detail hereafter.

Turning now to FIG. 5 of the drawings, there is shown a perspective view, taken along lines 5—5 of FIG. 1, showing the positioning of the lower transfer conveyors 44 and 46 on the fixed inner frame 80 which is, in turn, positioned beneath and within the moveable upper frame 22 of the applicant's device. In FIG. 5, the moveable upper frame 22 is shown in it's upper position with the transfer conveyors 44 and 46 being positioned below the elongated openings 40 and 42 in the rollers 34, 36, and 38.

FIG. 5 also shows the transfer conveyor motor 82 mounted on the inner fixed frame 80 which drives the transfer conveyors 44 and 46 by the transfer conveyor drive shaft 84 through it's drive sprocket 85 (shown in FIG. 5) and chain 106 (shown in FIG. 7). A second transfer conveyor shaft 86, (shown in FIG. 7), carries the sprockets that carry the other end of the transfer conveyor chains 44 and 46. There can also be seen in FIG. 5 how the roller shafts 88 of the upper rollers 34, 36, and 38 are mounted and are positioned for rotation in the horizontal channel 90 which forms a part of the upper moveable frame 22.

A pair of horizontal drive shafts 92 and 94 are used to power and to drive the four jacks 26, 28, 30, and 32 mounted on the upper moveable frame 22 with the drive motor 25 and a gear reducer (shown in FIG. 2). This drive motor 25 is an 1800 RPM motor attached to a Morse Style B, #I1830R primary gear reducer and a Morse Style SF, #SFI32 60 145TC secondary reducer.

This combination gives a double gear reduction from 30 to 1 and then from 60 to 1. The drive motor 25 is the type manufactured by Reliance Electric Company and with the Morse gear reducers, the shaft 94 is driven. This shaft is mounted, as shown, on the right side of FIG. 5. A connecting drive shaft transmits the driving power from the gear reducer to the left side drive shaft 92 but this is not seen in FIG. 5 of the drawings. The main take-off drive from the Morris gear reducer, attached to the drive motor 25, drives the shaft 94 located on the right side of the upper moveable frame 22.

The jack shafts 96 and 98 for the jacks 30 and 26 are fastened to bearing plates 100 and 102 as shown in FIG. 5. The opposite jack shafts for the opposite jacks 28 and 32 are also fastened to bearing plates 104 and 124.

Figure 6:
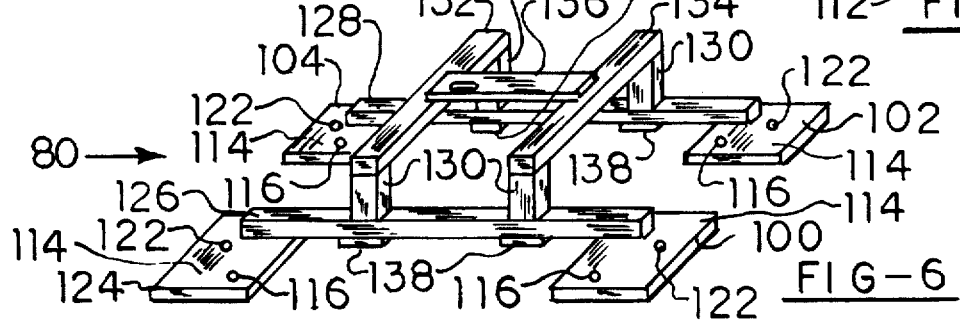
FIG. 6 is a schematic perspective view of the fixed inner frame that supports the chain type transfer conveyors used in the applicant's novel drop-down transfer device.

Turning now to FIG. 6 of the drawings, there is shown a schematic perspective view of the fixed inner frame 80 that supports the transfer conveyors 44 and 46 as well as the transfer conveyor motor 82 and gear reducer of the applicant's novel drop-down transfer device 10. A pair of elongated tubes 126 and 128 are welded to the bearing plates 100, 102, 104 and 124 as shown. A plurality of upright tubes 130 are welded to the elongated tubes 126 and 128 and to a pair of cross tubes 132 and 134.

A motor mounting plate 136 is welded to the cross tubes 132 and 134 and supports the transfer conveyor motor 82 as well as the associated gear reducer drive and reducer drive sprocket for rotating the drive shaft 84. A plurality of support pads 138 are welded as shown to the bottom surface of the elongated tubes 126 and 128 to complete the structure of the fixed inner frame 80. Each bearing plate 100, 102, 104 and 124 has a hole 116 drilled through the plate to mount the applicant's drop down transfer device 10 to the ground slab 78.

Each bearing plate 100, 102, 104, and 124 also has drilled through the plate, a drilled hole 122 for attaching the bottom of the jack shafts of the jacks 26, 28, 30, and 32 to the upper top surface 114 of each bearing plate.

Referring now to FIG. 7 of the drawings, there is shown in FIG. 7 a perspective view, taken along lines 7—7 of FIG. 5 showing in more detail the fixed inner frame 80 and the two transfer conveyors 44 and 46 as well as the positioning of the jack means for lowering and raising the moveable upper frame 22 downwardly and upwardly as desired. FIG. 7 shows the moveable upper frame 22 in it's upper position with the transfer conveyors 44 and 46 below the top of the rollers 34, 36, and 38. As mentioned before, the moveable upper frame 22 is designed to move downwardly and upwardly approximately 6 inches as shown in FIG. 7 by the arrow distance 110.

The downward movement of six inches will cause the inner transfer conveyors 44 and 46 to be exposed through the elongated openings 40 and 42 and to hold the weight of the container 76 as the container's weight is transferred from the rollers 34, 36, and 38 to the transfer conveyors 44 and 46. In addition, the lower surfaces 112 of the jack shafts of each jack 26, 28, 30, and 32 will ground on the upper surface 114 of the bearing plates 100, 102, 104, and 124 when the moveable upper frame 22 is in it's lower position. After the container 76 is moved from the applicant's drop-down transfer device 10 by operating the transfer conveyors 44 and 46, the reversing motor 25, for operating the jacks 26, 28, 30 and 32, is reversed and the moveable upper frame is raised upwardly to it's upper position ready for receiving the next container 76.

Figure 8:
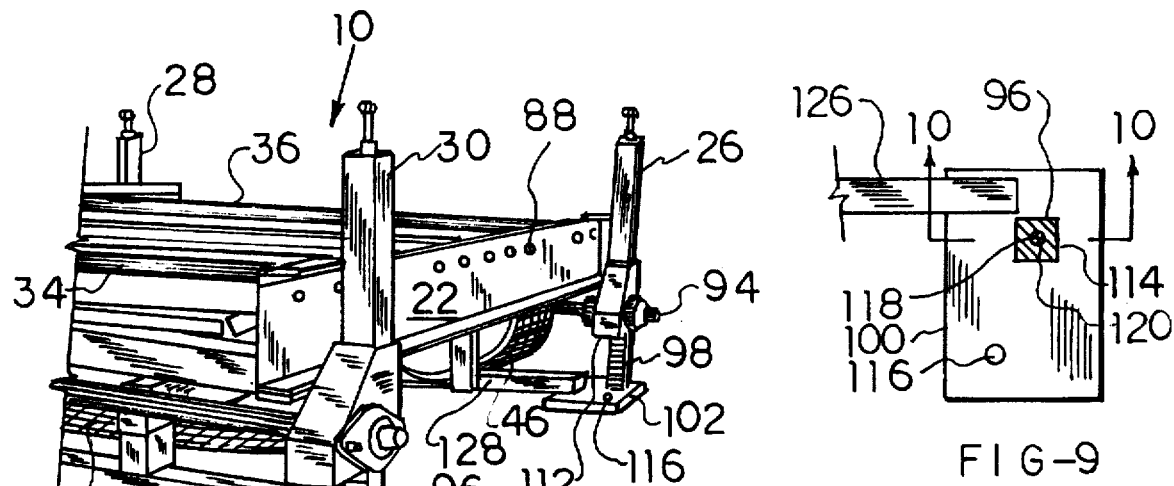
FIG. 8 is a partial perspective view, taken along lines 8—8 of FIG. 7, showing the mounting attachment of the moveable upper frame to the fixed lower frame bearing plates under the four corner jacks which are used to lower and raise the upper moveable frame.

Turning now to FIG. 8 of the drawings, there is shown in FIG. 8, a partial perspective view, taken along lines 8—8 of FIG. 7, showing in more detail, the mounting of the moveable upper frame 22 to the inner fixed lower frame 80 at the four corner jacks 26, 28, 30 and 32. FIG. 8 also shows the moveable upper frame 22 in it's upper position and FIG. 8 shows how the jack shafts 96 and 98 bear on the upper surface 114 of their respective bearing plates 100 and 102.

Figure 9:
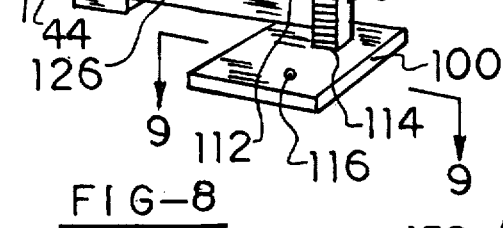
FIG. 9 is a cross sectional view, taken along lines 9—9 of FIG. 8 showing the bearing plates attached to the lower fixed frame which are attached to the jack shafts.

Turning now to FIG. 9 of the drawings, there is shown in FIG. 9, a plan view, taken along lines 9—9 of FIG. 8 showing the upper surface 114 of the bearing plates for the jack shafts. As before mentioned, a bolt 118 is screwed in a drilled and tapped hole 120 in the lower portion of each jack shaft. This rigidly fastens each of the jack shafts to it's respective bearing plate. In addition, each bearing plate is then bolted to the ground slab 78 which in effect rigidly fastens the complete drop-down transfer device 10 to the ground slab 78.

Figure 10:
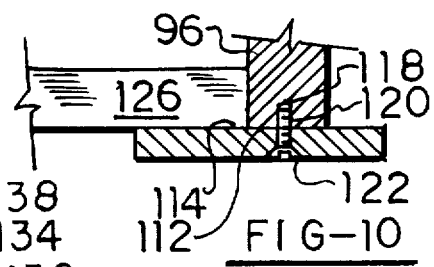
FIG. 10 is a cross sectional view, taken along lines 10—10 of FIG. 9, showing the attachment of the jack shafts to the lower bearing plates.

Turning now to FIG. 10 of the drawings, there is shown a cross sectional view, taken along lines 10—10 of FIG. 9, showing the preferred attachment of the jack shafts to the lower bearing plates 100, 102, 104, and 124. The jack shafts may also be welded to the bearing plates and other means of fastening them to the bearing plates may be utilized within the spirit and scope of the applicant's invention.

From the foregoing, it can be seen that there has been provided by the subject invention a new and novel bulk container drop-down transfer device which repositions and moves a large container, such as a bulk bag, moving in one original direction to a direction ninety degrees from it's original moving direction without lifting the heavy container. This is accomplished by using the weight of the container and the effect of gravity to aid in lowering the container to a pair of internally positioned transfer conveyors. While the preferred embodiment has been shown and described, it should be apparent from a study of the applicant's unique solution to the before mentioned problems, that modifications can be made in the subject invention.

For example, the two transfer conveyors may be replaced by a wider single transfer conveyor. In addition, the motor driven jacks could be replaced with pneumatic or hydraulic jacks without departing for the spirit and scope of the applicant's invention. The preferred embodiment shown and described has been given by way of illustration only and the applicant is not to be limited to the exact embodiment shown and described.

Having described my invention, I claim:

1. A transfer device for moving a large container from one position on the transfer device to another position on the transfer device and to change the moving direction of the container to a direction approximately ninety degrees from the original position of the container bag as it is moved on the transfer device, comprising:
   a. an upper moveable frame, moveable from an upper position to a lower position;
      (1.) a plurality of rollers mounted on the upper moveable frame, the rollers being mounted and grouped to provide at least one elongated opening on the upper moveable frame, the elongated opening permitting at least one transfer conveyor to be exposed and positioned within the spaced opening whenever the upper moveable frame moves from the upper position to the lower position;
      (2.) means, associated with the rollers, for rotating the rollers in a predetermined direction and at a predetermined speed in order to move the container as desired;
      (3.) means, associated with the upper frame, for lowering and raising the upper moveable frame and the rollers a pre-determined distance as desired;
   b. a inner fixed frame, positioned beneath and within the upper moveable frame and attached to the upper frame;
      (1.) at least one transfer conveyor, mounted on the inner fixed frame and within the upper moveable frame, the transfer conveyor being positioned beneath the elongated opening;
      (2.) means, associated with the transfer conveyor, for rotating the transfer conveyor at a pre-determined speed as desired;
   c. the lowering of the upper moveable frame around the inner fixed frame exposing the transfer conveyor which is positioned within the elongated opening in the rollers so that a container positioned on the rollers of the drop-down transfer device is transferred to and is carried by the transfer conveyor, thereby allowing the transfer conveyor to move the container in a direction ninety degrees from it's original position and off of the transfer device.

2. The transfer device as defined in claim 1 wherein the means for lowering and raising the upper moveable frame comprises in part at least one motor and gear reducer as well as a plurality of motor operated jacks.

3. The transfer device as defined in claim 1 wherein the upper moveable frame is lowered approximately six inches around the inner fixed frame in order to expose the transfer conveyor within the elongated opening and to transfer the weight of the container from the plurality of rollers on the upper moveable frame to the transfer conveyor on the inner fixed frame.

4. The transfer device as defined in claim 1 wherein there are two elongated openings on the upper moveable frame and there are two transfer conveyors mounted on the inner fixed frame, positioned in juxtaposition to the two elongated openings.

5. The transfer device as defined in claim 4 wherein the plurality of rollers on the upper moveable frame are spaced apart in a grouping with two pairs of outer rollers on each side of the frame and five inner rollers positioned between the two pairs of outer rollers, the five inner rollers being positioned in a central portion of the upper moveable frame, the grouping thereby providing the two elongated openings.

6. The transfer device as defined in claim 5 wherein the means for rotating the rollers on the upper moveable frame comprises in part at least one reversing gear motor with at least a portion of the rollers being driven by the motor.

7. The transfer device as defined in claim 1 further comprising a pair of first conveyors positioned on opposite sides of the drop-down transfer device and designed to move containers alternately towards the transfer device.

8. The transfer device as defined in claim 7 further comprising a pair of weigh fill stands positioned on opposite sides of the transfer device and adjacent to the pair of first conveyors and designed to weigh and to fill containers to be transported to the transfer device.

9. The transfer device as defined in claim 8 further comprising a pair of pallet dispensers positioned on opposite sides of the transfer device and adjacent to the pair of weigh fill stands and designed to move pallets positioned in the pallet dispenser alternately to a position beneath the weigh fill stands and alternately towards the transfer device.

10. The transfer device as defined in claim 9 further comprising at least one second conveyor, positioned on an outlet side of the transfer conveyor, and designed to move filled containers, positioned on the transfer device, ninety degrees away from the original position of the filled bags when positioned on the transfer conveyor.

11. The transfer device as defined in claim 10 further comprising an additional second conveyor, positioned adjacent to and downstream from the one second conveyor.

12. In a bulk bag transfer device used to move a large bulk containers carried by rollers from one direction to another direction, the device having an upper frame structure upon which a plurality of rollers are mounted, the device also having at least one transfer conveyor positioned within the frame structure, the improvement comprising:
   a. the transfer conveyor being designed to be carried by a fixed inner frame structure positioned within the upper frame and beneath the upper frame and attached to the upper frame;
   b. the transfer conveyor being designed to be mounted in a position on the fixed inner frame structure ninety degrees from the position of the rollers; and
   c. the upper frame structure being designed to be moveable, downwardly, as desired, around the inner fixed frame structure containing the transfer conveyor so as to expose the transfer conveyor and permitting the transfer conveyor to transfer the weight of the container from the rollers and onto the transfer conveyor.

13. The improvement as defined in claim 12 wherein the movement of the upper frame structure downwardly is approximately six inches.

14. In a bulk container transfer device used to move a large bulk container from one direction to another direction, the device having an upper frame structure upon which a plurality of rollers are mounted in one longitudinal direction, the device also having at least one transfer conveyor positioned within the upper frame structure and mounted in a second longitudinal direction ninety degrees from the longitudinal mounting of the plurality of rollers, the improvement comprising moving the upper frame structure downwardly to drop a bulk container, positioned on the upper plurality of rollers of the upper frame, onto the transfer conveyor positioned within and below the upper frame structure so that the transfer conveyor can transfer and can hold the weight of the bulk container and can subsequently move the bulk container off of the transfer device in a direction ninety degrees from the original travel direction of the bulk container.

15. The improvement as defined in claim 14 further comprising the transfer device having two transfer conveyors positioned within the upper frame structure and below the upper frame structure.

16. A transfer device for use in a manufacturing layout of the type designed to weigh and fill large bulk containers, and then to reposition and to move the large filled bulk containers ninety degrees away from the transfer device, comprising:

a. a drop-down transfer device, the device having,
   (1.) an upper moveable frame, moveable from an upper position to a lower position;
      (a.) a plurality of rollers mounted on the upper moveable frame, the rollers being mounted and grouped to provide a pair of elongated openings on the upper moveable frame, the pair of elongated openings permitting at least two transfer conveyors to be exposed and positioned within the spaced openings whenever the upper moveable frame moves from the upper position to the lower position;
      (b.) means, associated with the rollers, for rotating the rollers in a pre-determined direction and at a predetermined speed in order to move the bulk container as desired;
      (c.) means, associated with the upper moveable frame, for lowering and raising the upper moveable frame and the rollers a pre-determined distance as desired;
   (2.) an inner fixed frame, positioned beneath and within the upper moveable frame and attached to the upper frame;
      (a.) a pair of transfer conveyors, mounted on the inner fixed frame and within the upper moveable frame, the pair of transfer conveyors being positioned beneath the pair of elongated openings;
      (b.) means, associated with the pair of transfer conveyors, for rotating the pair of transfer conveyors at a predetermined speed as desired;
   (3). the lowering of the upper moveable frame around the inner fixed frame exposing the pair of transfer conveyors which are positioned within the pair of elongated opening in the rollers so that a bulk container, positioned on the rollers of the drop-down transfer device, is transferred to and is carried by the pair of transfer conveyors, thereby allowing the pair of transfer conveyors to move the bulk container in a direction ninety degrees from it's original position and off of the transfer device;

b. a pair of first chain conveyors positioned on opposite sides of the drop-down transfer device and designed to move the bulk containers alternately towards the drop-down transfer device;

c. a pair of weigh fill stands positioned on opposite sides of the drop-down transfer device and adjacent to the pair of first chain conveyors;

d. a pair of pallet dispensers positioned on opposite sides of the drop-down transfer device and adjacent to the pair of weigh fill stands and designed to move pallets beneath the weigh fill stands and towards the drop-down transfer device on the first chain conveyors;

e. at least one second chain conveyor, positioned on an outlet side of the drop-down transfer conveyor, and designed to move filled bulk containers ninety degrees away from the drop-down transfer conveyor.

17. The transfer device as defined in claim 16 wherein the drop-down transfer device is moveable approximately six inches below the pair of first chain conveyors so that the filled bulk containers may be lowered by the lowering and raising means with the aid of gravity thereby eliminating the need to lift the filled bulk container against the force of gravity in order to reposition the filled container.

* * * * *